May 20, 1924.  
G. H. HARRIS  
VALVE LOCK FOR AUTOMOBILES  
Filed Feb. 28, 1920  
1,495,132  
2 Sheets-Sheet 1
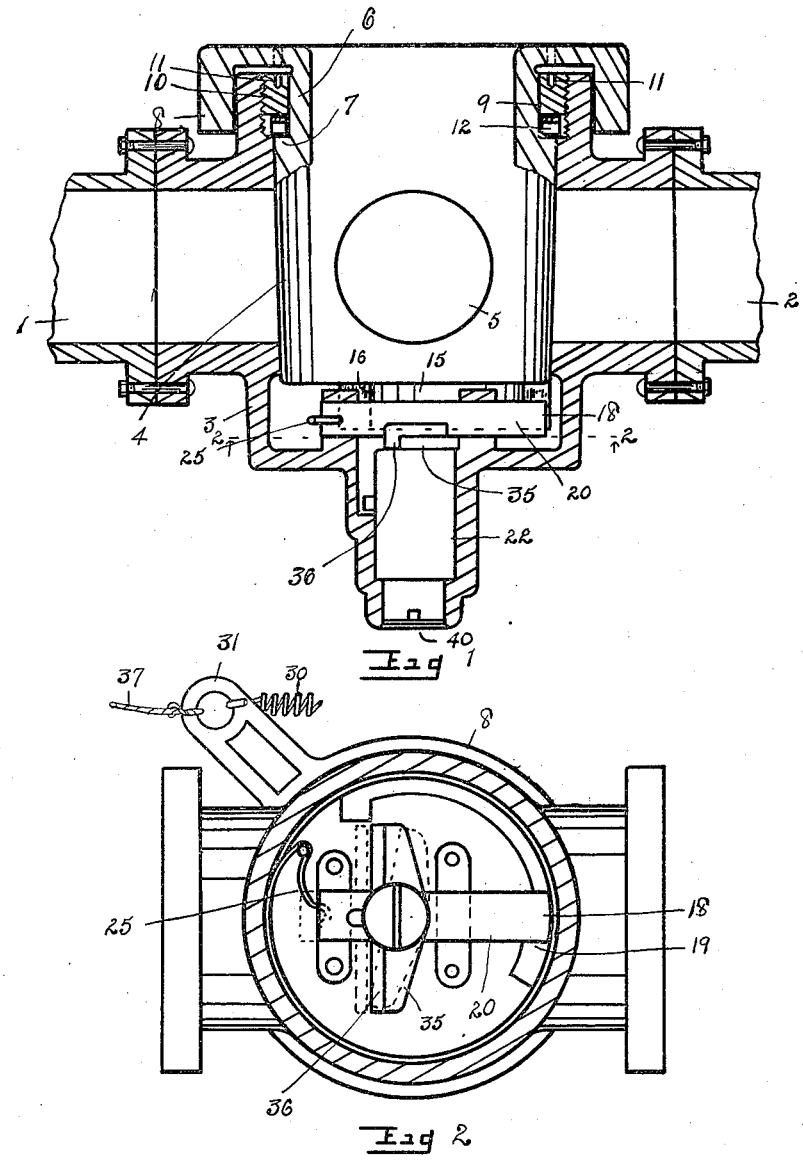
INVENTOR.  
GEORGE H. HARRIS  
BY Thomas L. Wilder  
ATTORNEY.

May 20, 1924.
G. H. HARRIS
VALVE LOCK FOR AUTOMOBILES
Filed Feb. 28, 1920
1,495,132
2 Sheets-Sheet 2
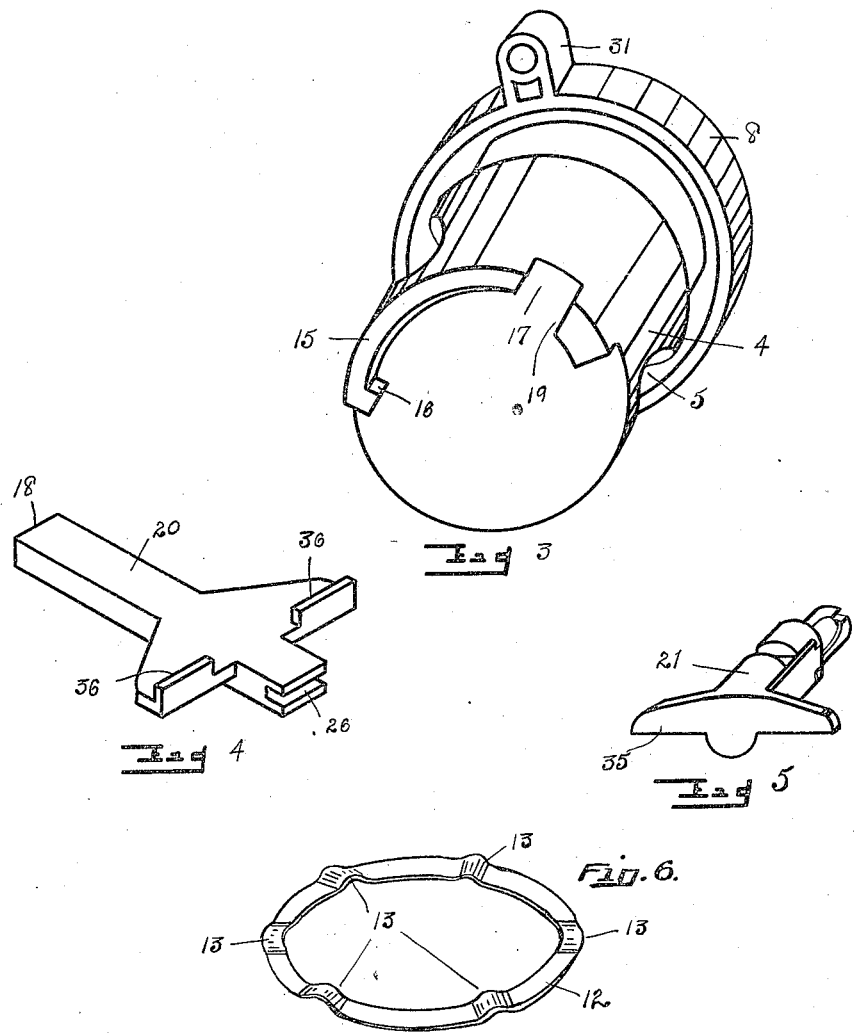
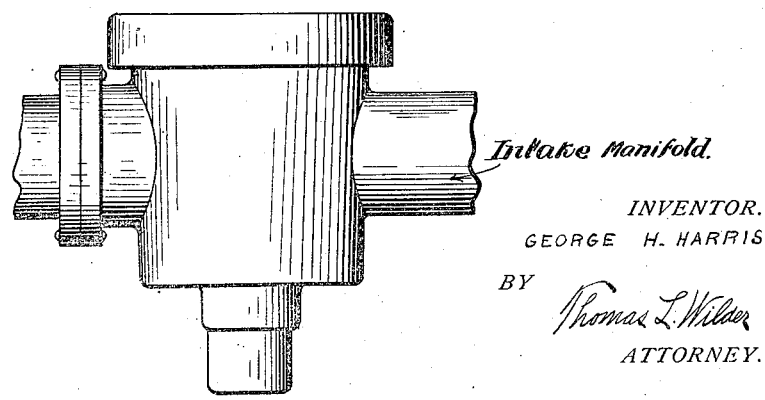
INVENTOR.
GEORGE H. HARRIS
BY Thomas L. Wilder
ATTORNEY.

Patented May 20, 1924.

1,495,132

UNITED STATES PATENT OFFICE.

GEORGE H. HARRIS, OF UTICA, NEW YORK, ASSIGNOR TO UTICA VALVE & FIXTURE COMPANY, OF UTICA, NEW YORK, A CORPORATION OF NEW YORK.

VALVE LOCK FOR AUTOMOBILES.

Application filed February 28, 1920. Serial No. 362,053.

*To all whom it may concern:*

Be it known that I, GEORGE H. HARRIS, a citizen of the United States, residing at Utica, in the county of Oneida and State of New York, have invented certain new and useful Improvements in Valve Locks for Automobiles, of which the following is a specification, reference being had therein to the accompanying drawing.

My invention relates to a valve lock for automobiles, and I declare the following to be a full, clear, concise and exact description thereof sufficient to enable anyone skilled in the art to which it appertains to make and use the same, reference being had to the accompanying drawings in which like reference characters refer to like parts throughout the specification.

The object of the invention is to provide a device for locking an automobile, while standing temporarily by the side of the road or curb, whereby to prevent the theft thereof. The locking is effected by inserting a rotary valve between the carburetter and manifold intake, so as to intercept or cut off the passage of gas from entering the engine, while so standing. A Yale or other similar lock is employed to retain the valve in closed position. In this manner, the automobile can be left standing without fear of molestation by unauthorized persons or miscreants.

The object will appear by referring to the drawings, in which:

Fig. 1 is a vertical section of the rotary valve and immediate parts;

Fig. 2 is a section taken on the line 2—2 of Fig. 1;

Fig. 3 is a perspective view of the rotary valve;

Fig. 4 is an enlarged detail view of a locking bolt employed;

Fig. 5 is an enlarged detail view of a Yale lock employed;

Fig. 6 is a detail view, showing a perspective of an annular ring employed.

Fig. 7 is an elevational view, showing parts broken away of a modification of the device.

Referring more particularly to the drawings, the pipe or conduit leading from the carburetter of an automobile is represented by 1 and the conduit leading to the manifold intake is represented by 2. Between said carburetter and manifold intake is disposed a valve casing 3 in which rests a rotary valve 4. The valve 4 is equipped with a centrally disposed conduit or passageway 5 adapted to aline with the conduits 1 and 2 when turned at the proper angle thereto.

The rotary valve 4 is equipped with a reduced neck 6 that is adapted to form with the body of the valve 3 a shoulder 7 and an annular flange 8, in such manner that there is made a chamber at 9 located between the surface of the neck 6 and said flange 8. Said valve 4 is assembled in its casing 3 and locked in such position by an annular ring 10 that is split for assembling purposes and provided with apertures 11—11 for the insertion of the teeth of a spanner wrench. Two corresponding apertures $11^a$, $11^a$, are made in the top of the valve 4 and are adapted to aline with apertures 11, 11, when valve 4 is in open position, whereby the teeth of the spanner wrench may reach said apertures 11, 11. Between the lower edge of the ring 10 and the shoulder 7 of the valve 4 is disposed an annular washer 12 that has convolutions 13 adapted to exert a pressure against the shoulder 7 in order to hold the valve 4 in a tight fitting manner within its tapering aperture of the casing 3. It will be noted, that the locking ring 10 is located in such position that it cannot be tampered with by unauthorized persons.

The lowermost surface of the valve 4 has formed thereon in an integral manner, a flange sector 15 that is equipped with a shoulder 16 and an opening 17 for co-operation with the end 18 of a bolt 20 of a Yale or other similar locking device 21 located in a chamber 22 formed in the lower part of the casing 3.

A spring 25 that has a bearing in a recess 26 formed in one end of the bolt 20 is adapted to urge said bolt 20 normally against the surface of the flange 15, whereby the end 18 of said bolt 20 will engage automatically the opening 17 to lock the valve 4 in closed position. Said end 18 will engage the shoulder 19, whereby to stop the turning of the valve 4 in closed position and will engage also the shoulder 16, whereby to stop the turning of said valve 4 in full open position. The valve 4 is turned automatically into full open position by a coiled spring 30 that is attached at one end to an arm 31 formed integral with the upper flange 8 of the valve 4 and at the other end to a member attached to the outer casing of conduit 2.

The bolt 20 is actuated against the spring 25, whereby to retract the end 18 from the opening 17 by the correspondingly formed member 35 of the Yale lock 21, which bears against the upturned flanges 36—36 formed integral with the bolt 20. The turning of said lock 21 will rotate the member 35 which will press against either flange 36 in either direction of rotation of said member 35 to, thereby, retract the bolt 20.

The operation of the valve lock is effected when the automobile is stopped temporarily by pulling upon the end of a cord 37 that is located near the seat of the chauffeur, the other end of said cord 37 being attached to the arm 31 of the valve 4, whereby to rotate said valve 4 against the pull of the coiled spring 30 in order to bring the opening 17 opposite the end 18 of the bolt 20 which will be forced automatically therein by the tension of the spring 25. In this position of the valve 4, the passageway of the gas from the carburetter to the intake manifold will be closed and, thereby, prevent any gas from reaching the cylinders of the engine, thus insuring the safety of the automobile against theft until the return of the owner who will insert a key into the usual aperture 40 of the Yale lock 21 to, thereby, turn the member 35 in order to retract the end 18 of the bolt 20 from its housing in opening 17. After the end 18 of the bolt 20 is withdrawn from the opening 17, the valve 4 will rotate automatically into full open position under the tension of spring 30. The contact of the end 18 of bolt 20 with the shoulder 16 of the flange 15 will stop the valve 4 automatically in full open position.

Said valve casing 3 can be cast integral with the carburetter casing or with the intake manifold, whereby to eliminate the possibility of separation of said valve casing 3 from its assembled position with reference to said carburetter and intake manifold by unauthorized persons. If said casing 3 is cast thus, it will become an integral part of the motor mechanism, and, therefore, the more difficult to tamper with.

Having thus described my invention what I claim as new and desire to secure by Letters Patent is:

1. In a valve lock for automobiles, a rotary valve having a reduced neck and an annular flange, a locking ring disposed within said chamber, an arm extending from said valve, whereby it may be turned and automatically locked in closed position, and spring means for turning said valve to open position.

2. In a valve lock for automobiles, a rotary valve having a reduced neck and an annular flange forming a chamber, a locking ring disposed within said chamber, means for limiting the turning of said valve in either open or closed position and a lock for holding said valve in closed position, whereby to prevent the passage of gas to the engine of said automobile.

3. In a valve lock for automobiles, a casing having a tapered aperture, a rotary valve adapted to turn in said aperture, a flange sector having a shoulder and opening formed therein and a spring actuated bolt adapted to cooperate with said opening in the flange sector, whereby to lock said rotary valve in closed position.

4. In a valve lock for automobiles, a casing having a tapered aperture, a rotary valve having an overhanging annular flange, said valve being adapted to turn in said tapered aperture, a flange sector with a shoulder and opening formed therein, a spring actuated bolt adapted to cooperate with said opening in the flange sector, whereby to lock the rotary valve in closed position, a key for withdrawing said bolt from the aperture, whereby to allow the valve to turn automatically to open position.

5. In a valve lock for automobiles, a casing having a tapered aperture, a rotary valve having an overhanging flange forming a chamber, adapted to turn in said aperture, a locking ring disposed in said chamber, an annular washer having convolutions adapted to hold the valve in a tight fitting manner in the first mentioned tapered aperture, a flange sector with a shoulder and opening formed therein, a spring actuated bolt adapted to cooperate with said opening in the flange sector, whereby to lock the rotary valve in closed position, and a key for withdrawing said bolt from the aperture, whereby to allow the valve to turn automatically to open position.

In testimony whereof I have affixed my signature.

GEORGE H. HARRIS.